US011183847B2

(12) United States Patent
Gohla-Neudecker et al.

(10) Patent No.: US 11,183,847 B2
(45) Date of Patent: Nov. 23, 2021

(54) STATIONARY STORAGE DEVICE FOR TEMPORARILY STORING ELECTRIC ENERGY IN AN ELECTRIC SUPPLY GRID, OPERATING METHOD, AND RETROFITTING MODULE FOR THE STATIONARY STORAGE DEVICE

(71) Applicant: Bayerische Motoren Werke Aktiengesellschaft, Munich (DE)

(72) Inventors: Bodo Gohla-Neudecker, Munich (DE); Jan Hesselmann, Neufahrn (DE); Stefan Juraschek, Neubiberg (DE); Soeren Mohr, Munich (DE); Albrecht Pfeiffer, Fahrenzhausen (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 124 days.

(21) Appl. No.: 16/569,222

(22) Filed: Sep. 12, 2019

(65) Prior Publication Data
US 2020/0001730 A1 Jan. 2, 2020

Related U.S. Application Data

(63) Continuation of application No. PCT/EP2018/055225, filed on Mar. 2, 2018.

(30) Foreign Application Priority Data

Mar. 13, 2017 (DE) .................... 10 2017 204 074.2
Apr. 27, 2017 (DE) .................... 10 2017 207 102.8

(51) Int. Cl.
*B60L 53/10* (2019.01)
*B60L 53/53* (2019.01)
(Continued)

(52) U.S. Cl.
CPC ............... *H02J 3/32* (2013.01); *B60L 50/60* (2019.02); *B60L 53/11* (2019.02); *B60L 53/14* (2019.02);
(Continued)

(58) Field of Classification Search
CPC .. B60L 53/11; B60L 2210/30; B60L 2210/10; B60L 53/14; H02J 7/0027; H02J 3/32
(Continued)

(56) References Cited

U.S. PATENT DOCUMENTS 8,970,176 B2 * 3/2015 Ballatine et al. ......... H02J 1/14
320/138
9,118,206 B2 * 8/2015 Peterson et al. ....... H01H 11/00
(Continued)

FOREIGN PATENT DOCUMENTS

DE  20 2010 005 543 U1  9/2010
DE  10 2010 015 758 A1  1/2011
(Continued)

OTHER PUBLICATIONS

PCT/EP2018/055225, International Search Report dated Apr. 11, 2018 (Three (3) pages).
German Search Report issued in German counterpart application No. 10 2017 207 102.8 dated Dec. 20, 2017, with Statement of Relevancy (Ten (10) pages).

*Primary Examiner* — Sun J Lin
(74) *Attorney, Agent, or Firm* — Crowell & Moring LLP (57) ABSTRACT

A stationary storage device temporarily stores electric energy in an electric supply grid, and includes at least one electric storage unit, each electric storage unit being connected to a common DC bus by a respective DC-DC converter. The stationary storage device includes a bidirectionally operated AC-DC converter that couples the common DC bus to the electric supply grid, and a charging device that exchanges energy with an electrically operated motor vehicle. The charging device includes a connection device (Continued)

that connects the electrically operated motor vehicle in order to exchange the energy, and a charge control device that controls the exchange of said energy. A coupling device electrically connects the connection device to the common DC bus via one or more DC-DC converters in order to exchange said energy.

17 Claims, 4 Drawing Sheets

(51) Int. Cl.
  *B60L 53/14* (2019.01)
  *H02J 7/00* (2006.01)
  *H02J 3/32* (2006.01)
  *B60L 50/60* (2019.01)
  *B60L 53/66* (2019.01)

(52) U.S. Cl.
  CPC .............. *B60L 53/53* (2019.02); *B60L 53/66* (2019.02); *H02J 7/0027* (2013.01); *B60L 2210/10* (2013.01); *B60L 2210/30* (2013.01)

(58) Field of Classification Search
  USPC .......................................................... 320/109
  See application file for complete search history.

(56) References Cited

U.S. PATENT DOCUMENTS

| | | | |
|---|---|---|---|
| 10,214,108 | B2 * | 2/2019 | Carcouet et al. ..... H02J 7/0014 |
| 10,283,966 | B2 * | 5/2019 | Macdonald ............... H02J 5/00 |
| 10,873,099 | B1 * | 12/2020 | Gurunathan et al. ........................ H01M 8/0494 |
| 2011/0148353 | A1 | 6/2011 | King et al. |
| 2011/0204720 | A1 | 8/2011 | Ruiz et al. |
| 2016/0121735 | A1 | 5/2016 | Sugano |
| 2018/0029486 | A1 | 2/2018 | Pfeilschifter et al. |
| 2020/0122960 | A1 * | 4/2020 | Valdivia Guerrero et al. ............. H02M 3/158 |

FOREIGN PATENT DOCUMENTS

| | | |
|---|---|---|
| DE | 10 2009 046 422 A1 | 5/2011 |
| DE | 10 2010 062 362 A1 | 6/2012 |
| DE | 10 2012 210 284 A1 | 12/2013 |
| DE | 10 2013 200 949 A1 | 7/2014 |
| DE | 11 2012 005 145 T5 | 10/2014 |
| DE | 10 2015 207 413 A1 | 10/2016 |
| EP | 2 784 900 A1 | 10/2014 |
| WO | WO 2013/159821 A1 | 10/2013 |

\* cited by examiner

STATIONARY STORAGE DEVICE FOR TEMPORARILY STORING ELECTRIC ENERGY IN AN ELECTRIC SUPPLY GRID, OPERATING METHOD, AND RETROFITTING MODULE FOR THE STATIONARY STORAGE DEVICE

CROSS REFERENCE TO RELATED APPLICATIONS

This application is a continuation of PCT International Application No. PCT/EP2018/055225, filed Mar. 2, 2018, which claims priority under 35 U.S.C. § 119 from German Patent Applications Nos. 10 2017 204 074.2, filed Mar. 13, 2017, and 10 2017 207 102.8, filed Apr. 27, 2017, the entire disclosures of which are herein expressly incorporated by reference.

BACKGROUND AND SUMMARY OF THE INVENTION

The invention relates to a stationary storage device for temporarily storing electric energy in an electric supply grid. The invention also relates to an operating method for operating such a stationary storage device and to a retrofitting module which can be installed in a conventional stationary storage device.

A stationary storage device may be installed or connected e.g. in a supply grid close to an electrical consumer or electrical generator so as to be able to avoid electric energy having to be transported over long distances by the supply grid in event of power peaks. Instead, the energy can be temporarily stored in the storage device on site. Another term for a supply grid is a rotary current network or transmission network.

One example of an application is the operation of a charging station or charging column for an electrically operated motor vehicle (an electric vehicle or hybrid motor vehicle) with an external charging interface (so-called plug-in variant). Charging with high electrical powers is necessary for its e-mobility. Since the number of electric vehicles in use and their technically possible charging power are constantly increasing, it is increasingly hard to provide these high powers at the charging columns for the stability and economic effectiveness of a supply grid. This is especially the case given the increasing simultaneity of charging processes with ever larger powers, i.e., when several electric vehicles are to be charged at one parking station, for example.

In order to move forward in time the local distribution of the electrical power in the supply grid and thereby avoid network bottlenecks, a stationary electrical storage device may be generally connected to the supply grid in a region in which electrical powers may occur as power peaks, in order to be able to provide a so-called peak shaving in this way. This can prevent the degradation of the charging power due to a network bottleneck.

Figure 1:
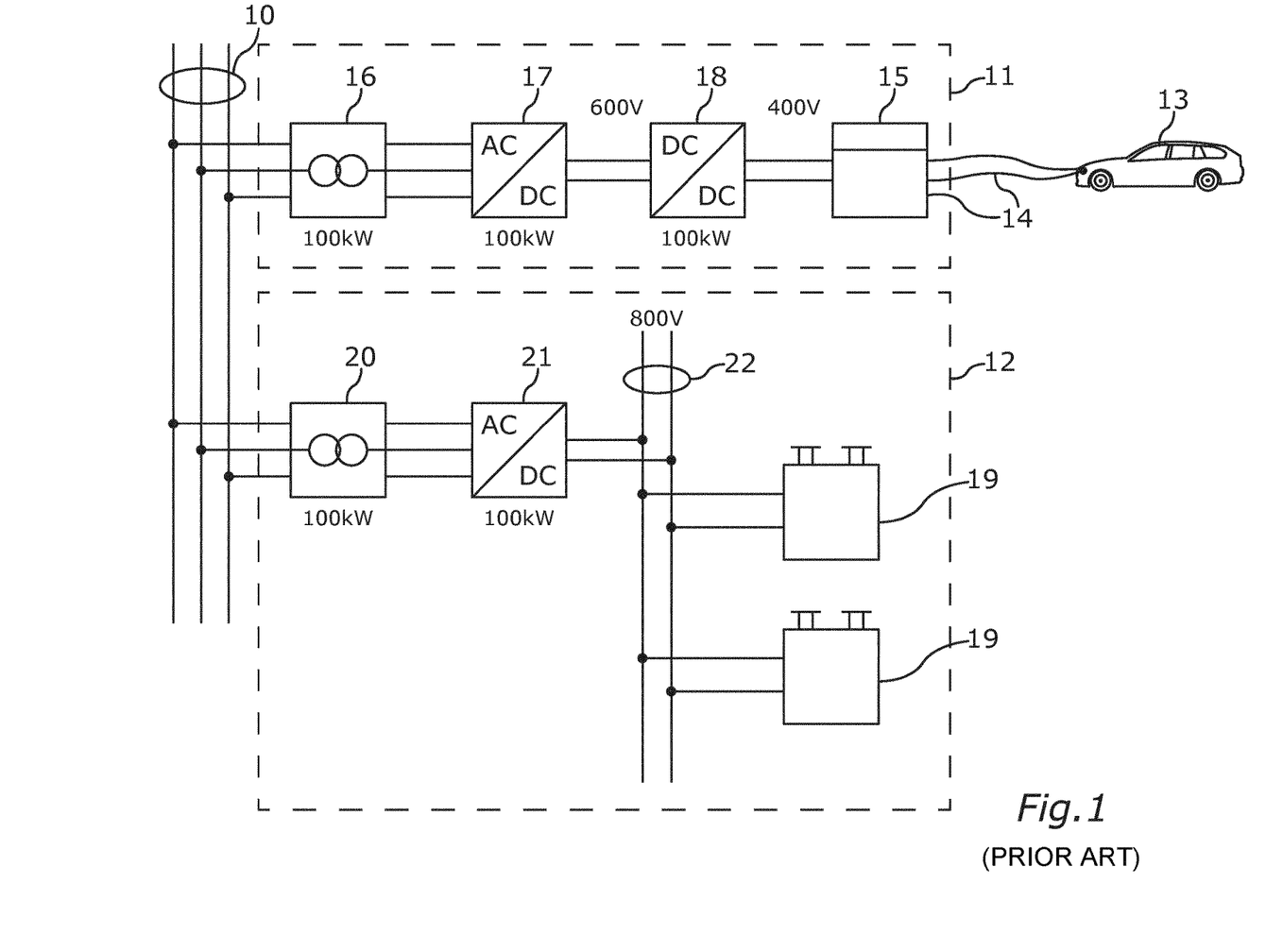
FIG. 1, a schematic representation of a charging station and a stationary storage device of the prior art.

In the case of charging stations, both at least one stationary electrical storage device and at least one electrical charging station should be connected to the supply grid in said geographical region, in order to be able to charge an electric vehicle with a given electrical power. This is illustrated for example in FIG. 1. There is shown a 3-phase supply grid 10, to which a charging station 11 and a stationary electrical storage device 12 can be connected. Through the charging station 11, an electric vehicle 13 can be charged with electric energy. For this, the electric vehicle 13 is connected to a connection device 14 of the charging station 11. In order to transmit electric energy from the supply grid 10 to the connection device 15, a transformer 16, an AC-DC (alternating current-direct current) converter 17, and a DC-DC converter 18 may be provided. For example, FIG. 1 gives figures for the transmission power (100 kW) and voltage level (600 V, 400 V). A charge control device 15 can request or determine for example a required charging voltage and/or transferable charging power from the motor vehicle via a communication with the motor vehicle in familiar manner. But the power path for the transmitting of charging energy runs only across the following components: transformer, AC-DC converter, DC-DC converter and connection device.

The stationary storage device 12 may comprise storage units 19, each of which can be for example an electrochemical accumulator (battery). In order to connect the storage units 19 to the electric supply grid 10, a transformer 20 and an AC-DC converter 21 can be provided. The AC-DC converter 21 can provide the generated DC voltage at a given voltage level (for example, 800 V in FIG. 1) on a DC bus 22, to which the storage units 19 can be connected. The DC bus 22 may be formed for example on the basis of current busbars or cables. It is not shown in FIG. 1 that the storage units 19 may be connected to the DC bus 22 across a respective DC-DC converter in order to be able to adjust the power flow between DC bus 22 and the respective storage unit 19.

The electric energy may thus be provided locally from the stationary storage device 12 via the supply grid 10 in the charging column 11 or be transmitted to the latter. But it is evident from FIG. 1 that a considerable number of electrical apparatuses is necessary for the supplying of the electric vehicle 13 with the desired electrical power and a required local storing of the electric energy in the stationary storage device 12, which accordingly makes the charging process uneconomical.

From US 2011/0204720 A1 there is known a charging station in which a stationary battery is integrated, from which a vehicle battery can be charged directly, so that no electric current is required from the supply grid for the charging process. The battery of a charging station can also be discharged into the supply grid in order to support it. However, the charging of a motor vehicle on the one hand and the supporting of a supply grid on the other hand take place in alternation. Thus, such a charging station can only provide one of these functions at a time.

From DE 10 2010 015 758 A1 there is described a charging station for charging an electrically operated motor vehicle which can deliver a large electrical power to a motor vehicle by means of dual-layer capacitors, the electrical power delivered being greater than the electrical power which can be provided by a supply grid.

From DE 10 2012 210 284 A1 there is known a charging station for an electric vehicle which can be connected to a household alternating current supply grid. While an electric vehicle is being charged, the charging station is separated from the supply grid. Thus, a charging process blocks the access to the supply grid.

The problem which the invention proposes to solve is to ensure network service performance (such as a frequency regulation, like providing a primary balancing power) to improve the network stability in an electric supply grid even during a charging process or a discharging process of an electrically operated motor vehicle.

The problem is solved by the subject matter of the independent patent claims. Advantageous modifications of the invention are described by the dependent patent claims, the following description, and the figures.

The invention provides a stationary storage device for temporarily storing electric energy in an electric supply grid. Such a stationary storage device may be provided for example as a temporary storage device at an electrical power station or at an electrical consumer, such as an industrial plant or an induction furnace, or in an area with vehicle charging stations. The stationary storage device may be used for the described peak shaving or for the providing of so-called balancing power in the supply grid or for both at the same time. For the temporary storing of energy, the stationary storage device has at least one electrical storage unit. Each storage unit is connected to a common DC bus by means of a respective DC-DC converter. The stationary storage device furthermore has a bidirectionally operated AC-DC converter for coupling the DC bus to the supply grid. In particular, the DC bus is coupled to the supply grid exclusively via the AC-DC converter. Optionally, a transformer can be hooked up at the grid side before the AC-DC converter in the described manner. By means of the bidirectionally operated AC-DC converter, electric energy according to a predetermined demand for electrical power can be alternately withdrawn from the supply grid and delivered to the supply grid in a controlled manner. For this, the stationary storage device can have a remote control design, so that it can be controlled from a central command station. The described layout of the at least one electric energy storage device, the DC bus and the AC-DC converter ensures in particular that at least one electrical storage unit is always or permanently coupled to the supply grid. Thus, the functionality of the stationary storage device is permanently or continuously available to the supply grid. The availability of the stationary storage device for the supply grid is thus constantly assured.

Now, in order to be able to also charge an electrically operated motor vehicle with electric energy by means of the supply grid and/or to remove electric energy from the motor vehicle (for example, for sale of energy) with low component expense, it is provided in the stationary storage device that it has a charging device for the charging and/or discharging of an electrically operated motor vehicle. Now, it is critical how this charging device is hooked up in the stationary storage device. The charging device has a connection device for connecting the motor vehicle for a charging process or discharging process. Furthermore, the charging device has a charge control device to control the charging process or discharging process. Moreover, a coupling device is provided, which is designed to electrically connect the connection device to the DC bus via one or more than one DC-DC converter at least for the duration of the charging process and/or discharging process. In the following, a charging process and a discharging process shall be uniformly called an energy exchange. The electric energy for the charging or discharging of the motor vehicle is thus transmitted across the DC bus, the coupling device and the connection device to which the motor vehicle is connected. Now, if energy is to be exchanged between the supply grid and the motor vehicle, the already present AC-DC converter can be used for this. Hence, no special AC-DC converter need be provided for the connection device. Furthermore, electric energy can also be transmitted from at least one electrical storage unit directly from its DC-DC converter, across the DC bus and the coupling device, to the connection device. This requires no conversion step across an AC-DC converter.

The charge control device (communication control device) of the charging device itself may be designed in known manner. For example, it may be a control device of a standard DC quick charging column and it may handle the data communication with the motor vehicle, for example in order to determine the required charging voltage and/or the transferable charging power. It should be noted that the charging function in particular is a DC charging. Wall boxes for AC charging are preferably not provided, or only with their own DC-AC converter.

The invention has the advantage that, building on a stationary storage device with low componentry expense, a functionality of a charging column is expanded or added. Thanks to the combining of the charging station with the stationary storage device to form a technical unit, components can be utilized synergistically by combining the connection device for the motor vehicle and the at least one electrical storage unit at the DC side across the DC bus to form a unit, so that the electrical charging current can be transferred directly from a storage unit to the motor vehicle, bypassing an AC-DC conversion. In particular, during a charging process in which energy is transferred from at least one storage unit to the motor vehicle, no conversion step of an AC-DC conversion (AC to DC and/or DC to AC) of one or more AC-DC converters is called for. Thus, the charging process may occur in the stationary storage device entirely at the DC side.

In order to connect or couple the connection device to the DC bus, it may be provided for example that the coupling device has its own additional DC-DC converter by which the connection device (like a storage unit) is hooked up to the DC bus. This advantageously makes it possible for each storage unit to remain permanently coupled to the electric supply grid. In particular, it is also possible to use herewith a stationary storage device having only a single storage unit for the energy exchange, said storage unit being hooked up across a DC-DC converter to the DC bus.

In order to obtain additional synergy in the interworking of the components, it is however especially preferably provided that the stationary storage device comprises two or more than two storage units and the coupling device provides a switching device which is designed to connect the DC-DC converter of one of the storage units to the connection device for the energy exchange of the motor vehicle in dependence on a switching signal. The charging device can thus be provided without its own or additional DC-DC converters. Instead, a storage unit is decoupled by the coupling device from its DC-DC converter and the DC-DC converter thus freed up is used to couple the connection device to the DC bus. Since at least one additional storage unit stands ready, the stationary storage device remains constantly available for the supply grid, and in addition electric energy can also be transferred from the at least one additional storage unit via the DC bus to the connection device.

The switching device may be designed such that a single DC-DC converter is utilized to connect the connection device to the DC bus. But then the energy from the corresponding storage unit will remain unused for the energy exchange. It is therefore preferably provided that the switching device is designed to switch from the DC-DC converter of the one storage unit to the DC-DC converter of another of the storage units during the energy exchange in dependence on the switching signal. In this way, all storage units can be made usable for the energy exchange, even if only switching between two DC-DC converters.

A suitable switching device for the switching of a DC-DC converter from one storage unit to a connection device may be provided in particular on the basis of at least one controllable switching element, wherein each switching element comprises a contactor and/or a power transistor. A power transistor may be, e.g., an IGBT (Insulated Gate Bipolar Transistor). A switching element is controllable if it can be controlled by means of the mentioned switching signal so that a switching state of the switching element is changed. Thus, the at least one controllable switching element may be switched or controlled for example by the charge control device or another control system of the stationary storage device. A switching element may be an alternating switch, which can switch between two DC-DC converters, or a simple switch (such as a contactor), which opens and closes the switching states.

In order to make the energy exchange especially efficient, it is provided that the connection device comprises a charging cable for the galvanic connection of the motor vehicle. Alternatively, it may be provided that the connection device comprises for example a primary electrical coil for an inductive energy exchange. For this, one would again require a DC-AC conversion or a primary coil which can be operated directly with DC (e.g., by switching the current). In the first case, the DC-AC conversion would be part of the primary coil (e.g., in a so-called ground plate).

In order to be able to store enough electric energy in a storage unit, it is preferably provided that each storage unit comprises respectively one or more electrochemical accumulators, i.e., one or more batteries. In addition or alternatively, a storage unit may comprise at least one capacitor, especially a dual-layer capacitor.

The invention also provides a method for operating the described stationary storage device, in order to charge an electrically operated motor vehicle with electric energy by means of the stationary storage device. At least one storage unit of the stationary storage device may be kept coupled temporarily or permanently to an electric supply grid across a DC-DC converter of the storage unit, a DC bus connected to the DC-DC converter, and an AC-DC converter connected to the DC bus. Thus, at least one storage unit of the stationary storage device remains constantly coupled to the electric supply grid. From the standpoint of the supply grid, therefore, the stationary storage device is constantly or continuously available in terms of its functionality as a temporary energy storage. During the energy exchange, the connection device is kept electrically connected to the DC bus. The connection device can be permanently coupled to the DC bus (by means of its own DC-DC converter) or be coupled as needed (by means of the described switching device for switching a DC-DC converter from a storage unit to the connection device) by means of the described coupling device. The connection device transfers electric energy from the DC bus to a connection device, by which the motor vehicle is connected to the connection device. The connection device may be for example the described charging cable.

Especially preferably, for the connecting of the connection device to the DC bus for the energy exchange one of several storage units of the stationary storage device is decoupled from its DC-DC converter and the DC-DC converter is coupled to the connection device. This can be done by means of the described switching device.

In order to be able to utilize each storage unit of the stationary storage device for the energy exchange, preferably during the energy exchange the decoupled storage unit is again coupled to its DC-DC converter and another one of the storage units is decoupled from its DC-DC converter and this DC-DC converter is coupled to the connection device. This can be done by means of the described modification of the switching device according to the invention. Then, after the energy exchange, each storage unit can again be coupled to its DC-DC converter, whereby the connection device is decoupled from the DC bus.

The invention also provides a retrofitting module in order to be able to realize or provide the additional function of a motor vehicle charging station in a stationary storage device. The retrofitting module for such a stationary storage device comprises a charging device for the charging of an electrically operated motor vehicle, wherein the charging device comprises the described connection device for connecting the motor vehicle for an energy exchange and a charge control device for controlling the energy exchange. Now, according to the invention, it is provided that a coupling device is provided, which is designed to electrically connect the connection device to a DC bus of the stationary storage device at least for the energy exchange. For this, the coupling device can provide in the described manner for example a DC-DC converter for connecting the connection device to the DC bus.

Preferably, however, it is provided that the coupling device comprises a switching device, the switching device decoupling a DC-DC converter of a storage unit of the stationary storage device from the storage unit in dependence on a switching signal and connecting it electrically to the connection device.

In order to utilize each storage unit for the energy exchange, it is provided in particular that the switching device alternately decouples two DC-DC converters from their storage units in dependence on the switching signal and electrically connects the DC-DC converter to the connection device with the storage unit decoupled.

Preferably, the energy exchange is controlled by the charge control device. For this, in particular, the charge control device is designed to implement one embodiment of the described method according to the invention, i.e., in particular, to generate the switching signal for the switching device in dependence on an energy exchange curve. The charge control device may comprise a microprocessor or a microcontroller for this, while a program code may be provided in a data storage which is designed, when executed by the microcontroller or the microprocessor, to carry out the embodiment of the method according to the invention. The charge control device communicates with the motor vehicle and a control system of the stationary storage device. This control system then organizes the interconnection and also in concert with the charge control device sets the voltage and/or current target values at the DC side.

Further features of the invention will emerge from the claims, the figures and the description of the figures. The features and combinations of features mentioned above in the description and the features and combinations of features mentioned below in the description of the figures and/or shown in the figures alone may be used not only in the particular indicated combination but also in other combinations or standing alone.

The invention shall now be explained with the aid of a preferred exemplary embodiment, also making reference to the drawings. There are shown:

Other objects, advantages and novel features of the present invention will become apparent from the following detailed description of one or more preferred embodiments when considered in conjunction with the accompanying drawings.

DETAILED DESCRIPTION OF THE DRAWINGS

In the figures, functionally equal elements are given the same reference numbers in order to demonstrate the functional equivalence of these elements.

Figure 2:
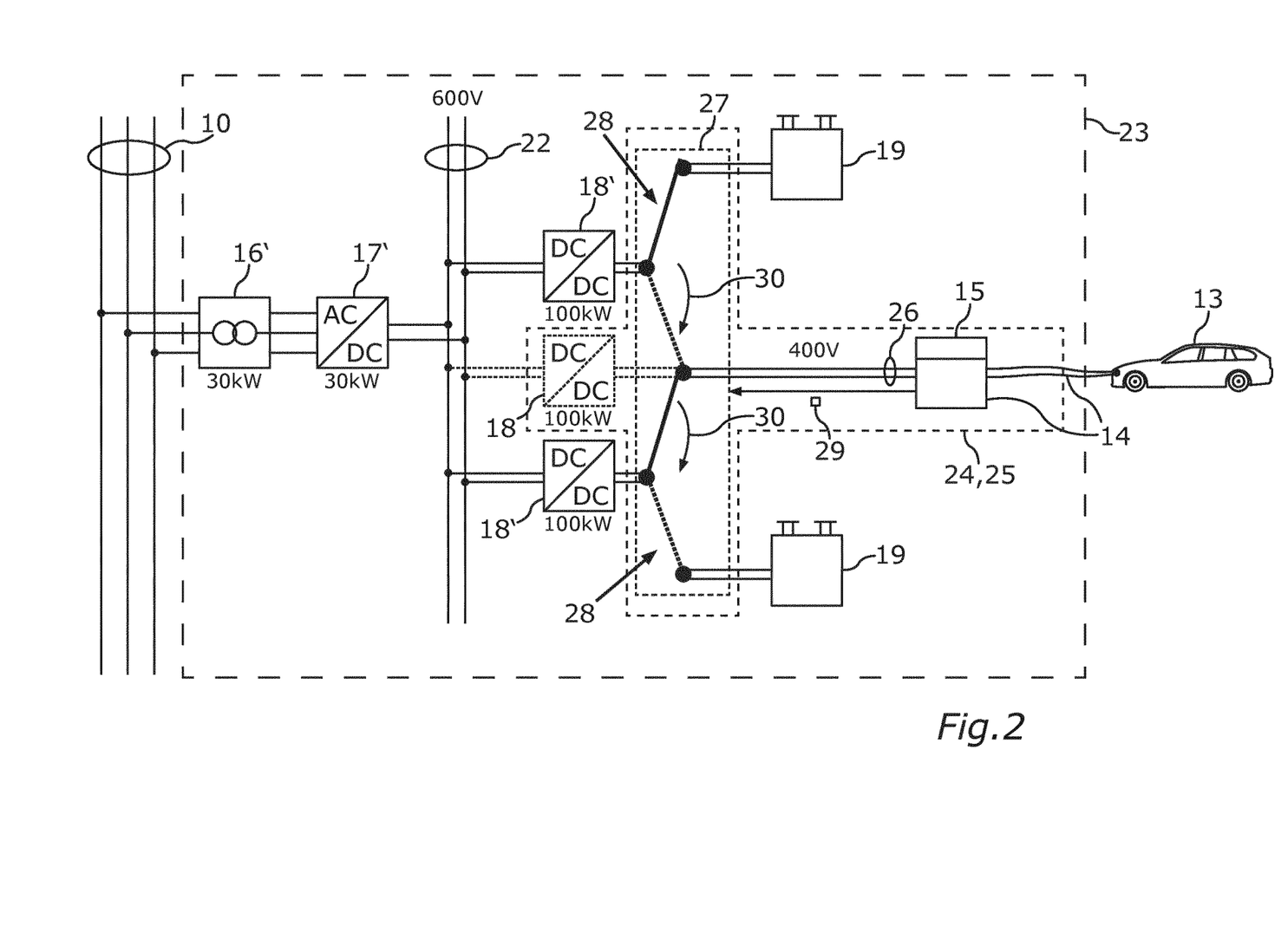
FIG. 2, a schematic representation of one embodiment of the stationary storage device according to the invention.

FIG. 2 shows a stationary storage device 23, which can be connected to a supply grid 10, which for example in the illustrated manner may comprise three phases with an effective voltage of 400 V, for example. For the buffering or temporary storing of electric energy, the stationary storage device 23 may comprise one or preferably more than one storage unit 19. A storage unit 19 may be formed, for example, on the basis of a battery or several batteries and/or a dual-layer capacitor or several dual-layer capacitors. Each storage unit 19 may be coupled across a DC-DC converter 18' to a DC bus 22. The DC bus 22 may be formed for example on the basis of busbars and/or cables. In the DC bus 22, an electric voltage with constant sign may be provided. The DC bus 22 may be interconnected with the supply grid 10 in familiar manner across an AC-DC converter 17' and optionally a transformer 16'.

In addition, an electrically operated motor vehicle 13 can also be charged with electric energy at the stationary storage device 23. For this, the motor vehicle 13 may be coupled with a charging device 24 of the stationary storage device 23 by means of a connection device 14. The connection device 14 may comprise an electrical cable, for example. The transfer of the electric energy to the motor vehicle 13 may be controlled by means of a communication carried out by the charge control device 15 of the charging device 24 in a manner known in the prior art.

The charging device 24 may be installed as a retrofitting module 25 in the stationary storage device 23. In order to be able to couple the connection device 14 to the DC bus 22, the connection device 14 may be interconnected for example by means of its own DC-DC converter 18 with the DC bus 22.

It is preferably provided that a switching device 27 is provided instead of the DC-DC converter 18, the switching device having at least one controllable switching element 28, wherein each switching element 28 is designed to alternately connect electrically one of the DC-DC converters 18' in each case either to one of the storage units 19 or to the connection device 14. Alternatively, the connection device 14 can also be electrically connected or disconnected by the switching element 28. An alternating circuit is not absolutely necessary. FIG. 2 shows the switching state in which the storage unit 19 depicted at the top is coupled to its DC-DC converter 18' and the connection device 14 is decoupled from this DC-DC converter 18', while the energy storage unit 19 depicted at the bottom is decoupled from its DC-DC converter 18' and this DC-DC converter 18' is coupled to the connection device 14. By a switching signal 29, which can be generated for example by the charge control device 15, a switching can be done in a changeover process 30 between the DC-DC converters 18' such that the storage unit 19 depicted at the bottom is coupled to its DC-DC converter 18' and the other DC-DC converter 18' depicted at the top is coupled to the connection device 14 and accordingly decoupled from its storage unit 19. Each switching element 28 may provide a respective contactor and/or a respective power transistor, such as a MOSFET (metal oxide semiconductor field effect transistor) or IGBT for one or for each pole for example. The changeover process 30 may be brought about e.g. by the charge control device 15 by means of a switching signal 29.

The DC-DC converter 18 or alternatively the switching device 27 constitutes in each case a coupling device K for the coupling of the connection device 14 to the DC bus 22.

In FIG. 2, the exemplary figures for a transferred electrical power show that the transformer 16' and the AC-DC converter 17' may have a lower transmission power than the DC-DC converter 18'. The reason for this is that during a charging process of the motor vehicle 13 with an electrical power which is greater than the transmission power of the AC-DC converter, the required electrical power can be provided on the DC bus 22 from at least one storage unit 19 by means of its DC-DC converter 18'.

Since the stationary storage device 23 requires only a minor technical update to provide the function of the charging station for the motor vehicle 13 and few additional components are needed for this, especially the switching device 27 and the installation of the charge control device 15 and the connection device 14, the charging device 24 may be provided as the retrofitting module 25 for a conventional stationary storage device. In addition, such a charging device 24 may comprise at least one electrical safety device (such as a fuse) and/or a control monitor for operating the charge control device 15.

The charging device 24 is intended in particular for a DC quick charging, i.e., for a charging power greater than 10 kW, especially greater than 20 kW.

Additional components of a charging station, such as its own inverter (AC-DC converter), a DC voltage converter (DC-DC converter) and a transformer are not necessary or are already present in the stationary storage device already provided.

Thus, by means of the retrofitting module 25, a stationary storage device 23 is additionally supplemented or upgraded with the function of a charging station or charging column.

Figure 3:
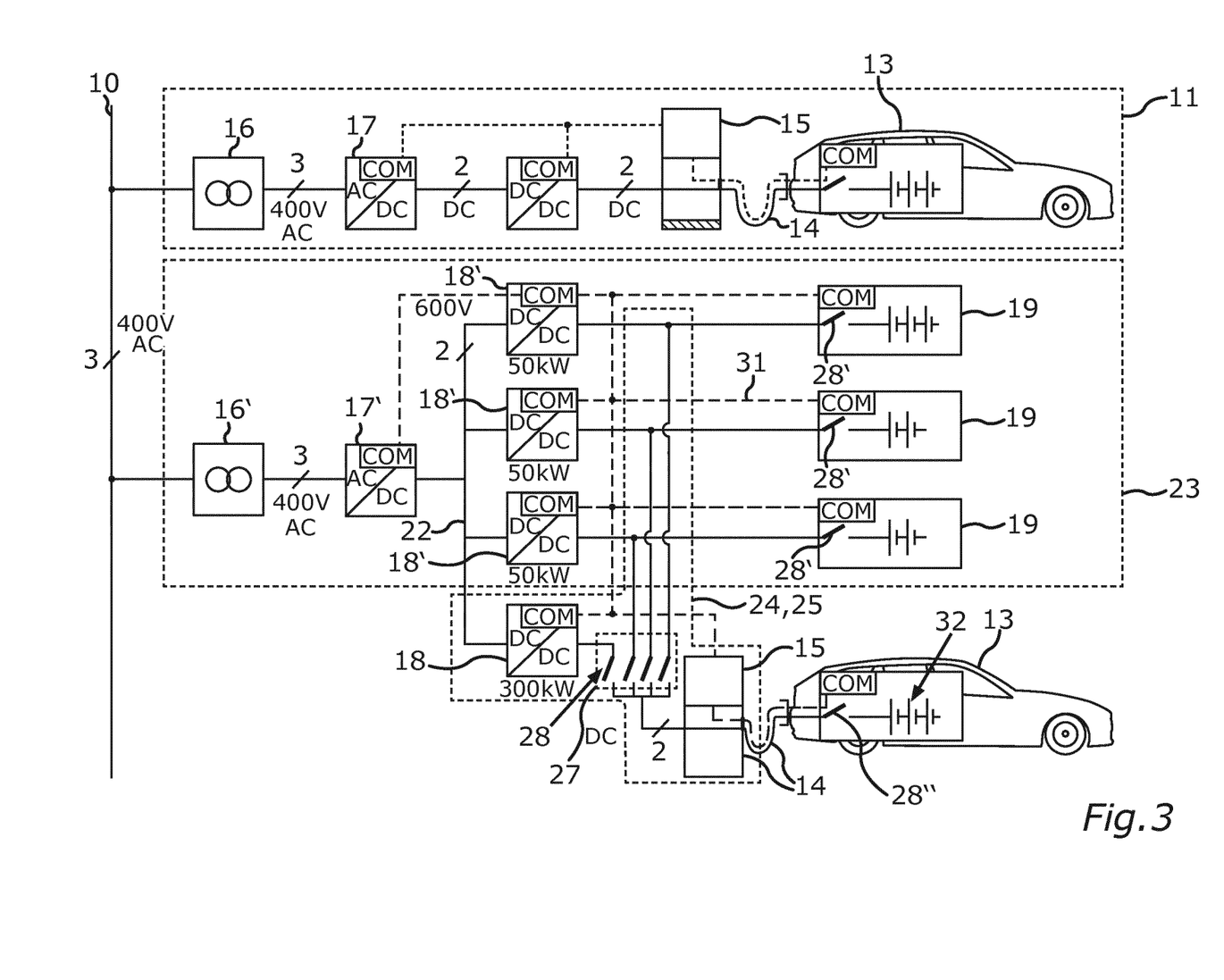
FIG. 3, a schematic representation of another embodiment of the stationary storage device according to the invention.

FIG. 3 describes an alternative embodiment of the stationary storage device 23 with installed retrofitting module 25. Elements functionally identical with the stationary storage device 23 of FIG. 2 are in each case given the same reference numbers in FIG. 3 as the corresponding element from FIG. 2.

FIG. 3 illustrates in addition how the charge control device 15 can control the storage units 19 and the DC-DC converters 18, 18' for a charging process by communication pathways or communication connections 31 on the basis of communication interfaces COM. For the sake of clarity, only a single communication connection 31 is provided with a reference number. The communication connections 31 are represented by broken lines. The communication connections 31 may be realized by cables, for example, by means of a communication bus.

By a communication connection 31, the charge control device 15 may also obtain said charging data for example the required charging voltage and/or the permitted charging power from the motor vehicle 13. The combination connection 31 may be realized via the connection device 14 in a manner known per se.

In the embodiment shown in FIG. 3, the switching elements 28 of the switching device 27 may be designed as simple switches for changing between a conducting and a non-conducting state, i.e., as contactors for example. In order to be able to connect a DC-DC converter 18' of a storage unit 19 to the connection device 14 for a charging process by closing one of the switching elements 28, the corresponding storage unit 19 may be electrically disconnected from its DC-DC converter 18' by opening a switch 28' of the switching unit 19 itself or an upstream switch (not shown). This can be controlled by the charge control device 15 via the communication connections 31. The electric voltage to be provided by the DC-DC converter 18' may then likewise be set by the charge control device 15.

Inside the motor vehicle 13, an electrical connection between the connection device 14 and a traction battery 32 of the motor vehicle 13 can be provided by a switch 28".

Figure 4:
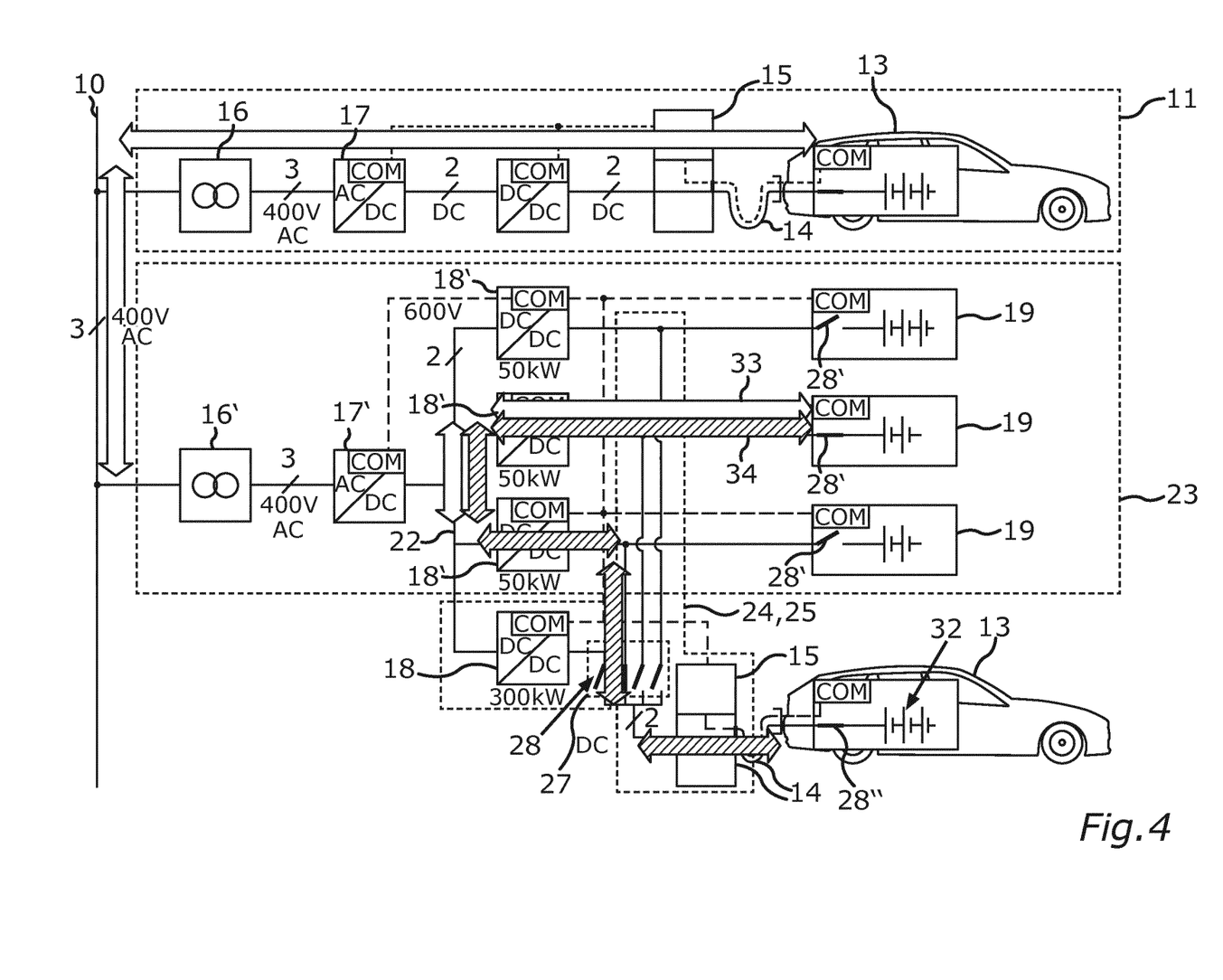
FIG. 4, a schematic representation of the stationary storage device of FIG. 3 during a charging operation.

FIG. 4 illustrates a comparison between a charging process of a motor vehicle 13 at a conventional charging column 11 (as described in FIG. 1) and a charging process of another motor vehicle 13 at the stationary storage device 23 with its retrofitting module 25.

There is shown on the one hand the energy flow 33 from a storage unit 19 to the motor vehicle 13 at the charging column 11. Six conversion steps occur in this process.

By comparison, the energy flow 34 is shown as it results during the charging process of the motor vehicle 13 at the charging device 24 of the stationary storage device 23. In this charging process, only two conversion steps occur, i.e., four conversion steps are saved as compared to the use of a conventional charging column 11. This reduces the power loss during the charging process.

The examples show how a stationary battery storage device with a DC quick charging functionality can be provided by the invention.

LIST OF REFERENCE NUMBERS 10 supply grid
11 charging station
12 stationary storage device
13 electrically operated motor vehicle
14 connection device
15 charge control device
16 transformer
16' transformer
17 AC-DC converter
17' AC-DC converter
18 DC-DC converter
18' DC-DC converter
19 storage unit
20 transformer
21 AC-DC converter
22 DC bus
23 stationary storage device
24 charging device
25 retrofitting module
26 input conductor
27 switching device
28 switching element
28' switch
28" switch
29 switching signal
30 changeover process
31 communication connections
32 traction battery The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A stationary storage device configured to temporarily store electric energy in an electric supply grid, the stationary storage device comprising:
   at least one electric storage unit, each electric storage unit being connected to a common DC bus by a respective DC-DC converter;
   a bidirectionally operated AC-DC converter for coupling the common DC bus to the electric supply grid;
   a charging device, comprising: a connection device configured to electrically connect an electrically operated motor vehicle to the stationary storage device, and a charge control device configured to control exchange of energy therewith; and
   a coupling device configured to alternatively:
      (a) electrically connect the connection device to the common DC bus via one or more DC-DC converters so as to enable energy exchange with the electrically operated vehicle, and
      (b) electrically connect the at least one electric storage unit to the common DC bus via the respective DC-DC converter so as to enable energy exchange with the at least one electric storage unit.

2. The stationary storage device according to claim 1, wherein the stationary storage device comprises at least two electric storage units, and the coupling device provides a switching device which is configured to connect a first DC-DC converter of a first electric storage unit to the connection device for exchanging said energy based on a switching signal.

3. The stationary storage device according to claim 2, wherein the switching device is configured to switch from the first DC-DC converter to a second DC-DC converter of a second electric storage unit during an exchange of said energy.

4. The stationary storage device according to claim 2, wherein the switching device comprises at least one controllable switching element having a contactor and/or a power transistor.

5. The stationary storage device according to claim 3, wherein the switching device comprises at least one controllable switching element having a contactor and/or a power transistor.

6. The stationary storage device according to claim 1, wherein the coupling device comprises two DC-DC converters by which the connection device is connected to the common DC bus.

7. The stationary storage device according to claim 1, wherein the connection device comprises a charging cable for a galvanic connection of the electrically operated motor vehicle.

8. The stationary storage device according to claim 1, wherein each electric storage unit comprises one or more electrochemical accumulators.

9. A method for operating a stationary storage device for an energy exchange with an electrically operated motor vehicle, wherein the stationary storage device includes:
   at least one electric storage unit, each electric storage unit being connected to a common DC bus by a respective DC-DC converter, a bi-directionally operated AC-DC converter for coupling the common DC bus to the electric supply grid, a charging device, comprising: a connection device configured to electrically connect the electrically operated motor vehicle to the stationary storage device, and a charge control device configured to control exchange of energy therewith, and a coupling device configured to alternatively: (a) electrically connect the connection device to the common DC bus via one or more DC-DC converters so as to enable the energy exchange, and (b) electrically connect the at least one electric storage unit to the common DC bus via the respective DC-DC converter so as to enable energy exchange with the at least one storage unit, the method comprising:

maintaining, during the energy exchange, the electrical coupling of the connection device to the common DC bus across the one or more DC-DC converters, wherein the connection device transfers electric energy between the common DC bus and the electrically operated motor vehicle.

10. The method according to claim 9, wherein for said coupling of the connection device to the common DC bus, the method comprises:

decoupling a first electric storage unit of the stationary storage device from a respective first DC-DC converter;

coupling the respective first DC-DC converter to the connection device.

11. The method according to claim 10, wherein the method further comprises:

coupling, during the energy exchange, the first electric storage unit back to the respective first DC-DC converter;

decoupling a second electric storage unit from a respective second DC-DC converter; and coupling the respective second DC-DC converter to the connection device.

12. A retrofitting module for a stationary storage device, wherein the stationary storage device includes:

at least one electric storage unit, each electric storage unit being connected to a common DC bus by a respective DC-DC converter;

a bidirectionally operated AC-DC converter for coupling the common DC bus to the electric supply grid; and a charging device comprising: a connection device configured to electrically connect an electrically operated motor vehicle to the stationary storage device for an electric energy exchange, and a charge control device configured to control the electric energy exchange, the retrofitting module comprising:

a coupling device configured to alternatively;

(a) electrically connect the connection device to the common DC bus via one or more DC-DC converters so as to enable the electric energy exchange, and (b) electrically connect the at least one electric storage unit to the common DC bus via the respective DC-DC converter so as to enable energy exchange with the at least one electric storage unit.

13. The retrofitting module according to claim 12, wherein the coupling device comprises a switching device configured to decouple two DC-DC converters of the respective DC-DC converters alternately from a respective storage unit of the stationary storage device based on a switching signal and to electrically connect the one or more DC-DC converters to the connection device with the storage unit decoupled.

14. The retrofitting module according to claim 12, wherein the coupling device provides the one or more DC-DC converters configured to connect the connection device to the common DC bus.

15. The retrofitting module according to claim 12, wherein the charge control device is configured to maintain, during the energy exchange, the connection device electrically coupled to the common DC bus across the one or more DC-DC converters, wherein the connection device transfers electric energy between the common DC bus and the electrically operated motor vehicle.

16. The retrofitting module according to claim 13, wherein the charge control device is configured to maintain, during the energy exchange, the connection device electrically coupled to the common DC bus across the one or more DC-DC converters, wherein the connection device transfers electric energy between the common DC bus and the electrically operated motor vehicle.

17. The retrofitting module according to claim 14, wherein the charge control device is configured to maintain, during the energy exchange, the connection device electrically coupled to the common DC bus across the one or more DC-DC converters, wherein the connection device transfers electric energy between the common DC bus and the electrically operated motor vehicle.

* * * * *